United States Patent
Yoshida et al.

[11] Patent Number: 6,133,704
[45] Date of Patent: Oct. 17, 2000

[54] MOTOR DRIVE UNIT FOR VEHICULAR DOOR MIRROR ASSEMBLY

[75] Inventors: Shigeki Yoshida; Kenichi Hayashi, both of Aichi, Japan

[73] Assignee: Kabushiki Kaisha Tokai Rika Denki Seisakusho, Aichi, Japan

[21] Appl. No.: 09/284,747

[22] PCT Filed: Aug. 12, 1998

[86] PCT No.: PCT/JP98/03591

§ 371 Date: Apr. 20, 1999

§ 102(e) Date: Apr. 20, 1999

[87] PCT Pub. No.: WO99/08898

PCT Pub. Date: Feb. 25, 1999

[30] Foreign Application Priority Data

Aug. 20, 1997 [JP] Japan ..................................... 9-223430

[51] Int. Cl.[7] .............................. H02P 7/00; G02B 7/18; F16D 7/06
[52] U.S. Cl. ......................... 318/466; 318/467; 318/468; 466/36; 359/841; 359/877; 248/900
[58] Field of Search ................................... 318/260–283, 318/460–493; 464/36, 37, 38, 41; 359/841, 877; 350/637, 604; 248/900, 478, 479; 192/106.1, 30

[56] References Cited

U.S. PATENT DOCUMENTS

| | | | |
|---|---|---|---|
| 4,832,477 | 5/1989 | Torii et al. | 350/637 |
| 4,893,916 | 1/1990 | Sakuma et al. | 350/637 |
| 4,919,526 | 4/1990 | Umekawa et al. | 350/604 |
| 4,982,926 | 1/1991 | Mori et al. | 248/479 |
| 5,190,499 | 3/1993 | Mori et al. | 464/36 |

FOREIGN PATENT DOCUMENTS

| | | |
|---|---|---|
| 10-129349 | 5/1998 | Japan . |
| 10-166945 | 6/1998 | Japan . |

*Primary Examiner*—Paul Ip

[57] ABSTRACT

An electric driving device which rotates a visor with respect to a stay, and includes a visor side ring having an inclined surface and a stay side ring having an inclined surface. When the visor is rotated from a using position to a housing position, the inclined surfaces ride on each other to securely form a predetermined gap between the stay and the visor. Meanwhile, when the visor is rotated from the housing position to the using position, the inclined surfaces slide down each other so that the gap between the stay and the visor approaches zero.

3 Claims, 6 Drawing Sheets

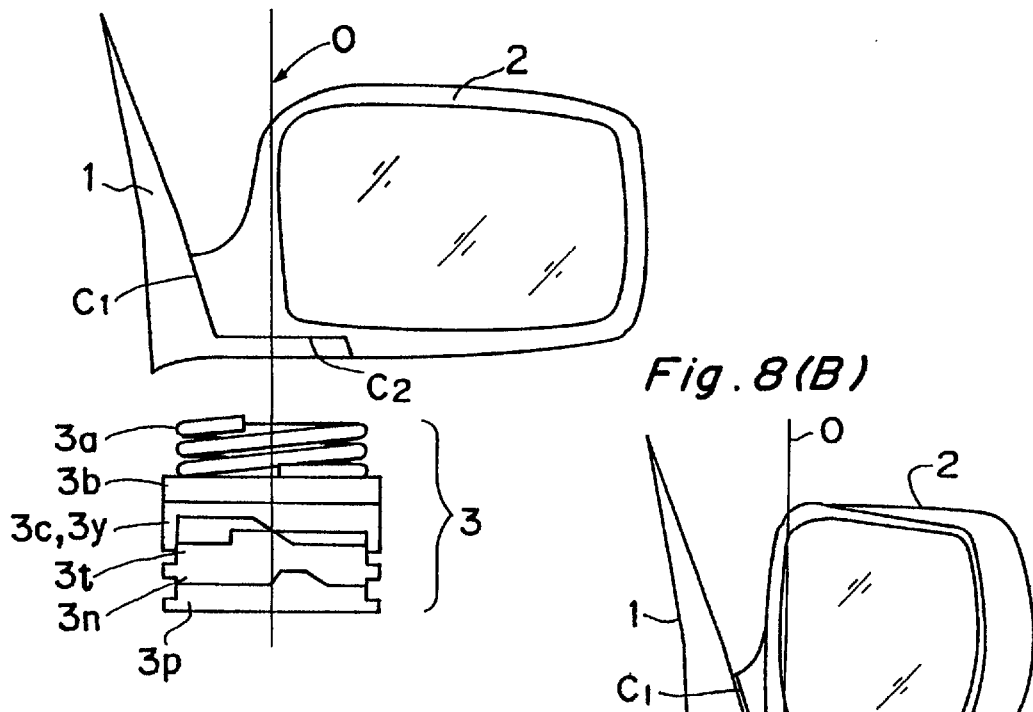
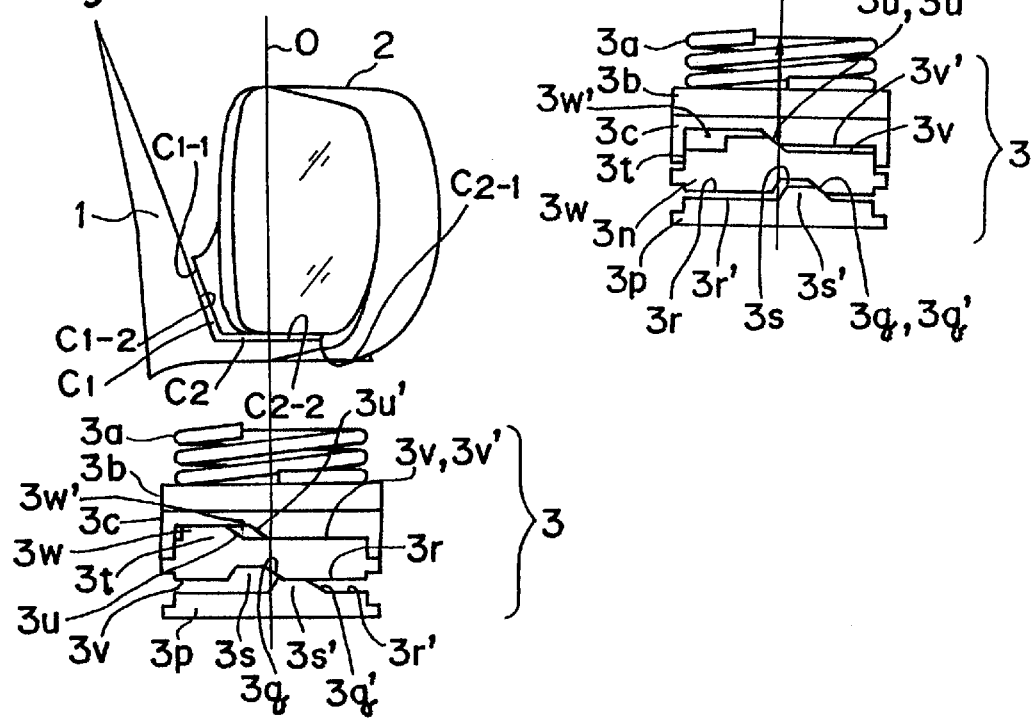
Fig.8(A)
Fig.8(B)
Fig.8(C)

MOTOR DRIVE UNIT FOR VEHICULAR DOOR MIRROR ASSEMBLY

This application is the national phase under 35 U.S.C. §371 of PCT International Application No. PCT/JP98/03591 which has an International filing date of Aug. 12, 1998 which designated the United States of America.

TECHNICAL FIELD

The present invention generally relates to an electric driving mechanism of a door mirror assembly for an automobile in which the door mirror assembly has a stay fixed to a door of the automobile and has a visor electrically driven relative to the stay between a using position and a housing position or between the using position and an emergently escaping position, and particularly relates to an improvement technique for conditioning a gap inevitably forming between the stay and the visor at the time of use.

BACKGROUND ART

FIG. 1 shows a conventional door mirror assembly in which a visor thereof is electrically driven. In the figure, a reference numeral 1 points to a stay which is fixed to a door of an automobile, and a reference numeral 2 points to a visor which is rotatably mounted on the stay 1. As shown in FIG. 2, the visor 2 of the door mirror assembly is rotatable with respect to the stay 1 between a using position, a housing position which is located behind the using position and an emergency escaping position which is located in front of the using position. The visor 2 is electrically driven by an electric driving system, a part of which is mounted on the stay 1, and a part of which is mounted on the visor 2.

The visor 2 has an inner bottom surface C2-1 and an inner side surface C1-1. On the other hand, the stay 1 has a generally horizontal surface C2-2 which supports the inner bottom surface C2-1 of the visor 2 from below, and has a longitudinal surface C1-2 which faces the visor 2 in parallel with the inner side surface C1-1 of the visor 2, where there are formed a gap C1 and a gap C2, therebetween, respectively. These gaps C1 and C2 are necessary elements required to let the visor 2 rotate smoothly with respect to the stay 1. Therefore, it is not possible to make the gaps C1 and C2 very small.

However, if the gaps C1 and C2 are more than 0.4 mm therebetween, there arises a problem that the gaps may cause a whistle effect to generate an air-striking sound when the automobile runs at a high speed. The more silent and quieter the interior of the automobile is, the more notieceable and pronounced the air-striking sound becomes due to the whistle effect. In order to solve this problem, such a countermeasure has been conventionally taken, for example, as to put a sponge body between the gaps or as to implant artificial hair on a surface forming the gaps, so as not to hinder the rotation of the visor. However, with the use of such means for a countermeasure, it is necessary to provide the gaps with the additional member(s) thereof; therefore, there arises a problem that the additional member(s) deteriorate(s) and/or become(s) worn with age.

Observing the necessity of the gaps therebetween, it is found that they are necessary only during times when the visor is rotated, that they are not necessary the visor is in the using position.

DISCLOSURE OF THE INVENTION

Accordingly, it is a main object of the present invention to provide an electric driving mechanism of a door mirror assembly in which a driving system for driving a visor forms the aforementioned gaps only during times when the visor is rotated and to makes the gaps approach zero when the visor is in the using position.

In order to achieve the aforementioned object, a fundamental idea of the present invention is characterized in that the driving system for rotating the visor with respect to the stay is provided with a first visor side ring having an inclined surface and with a first stay side ring having an inclined surface, wherein when the visor rotates from a using position to a housing position, the inclined surface of the first visor side ring and the inclined surface of the first stay side ring ride on each other so that a predetermined gap is secured between the visor and the stay, and wherein, on the other hand, when the visor rotates from the housing position to the using position, the inclined surface of the first visor side ring and the inclined surface of the first stay side ring slide down from each other so that the predetermined gap therebetween approaches zero.

More specifically, the electric driving mechanism comprises: the stay which is mounted on an outer surface of a door; the visor which is rotatably mounted on the stay between the using position and the housing position; and the electric driving system for rotating the visor with respect to the stay. The visor has an inner bottom surface and an inner side surface; meanwhile, the stay has a generally horizontal surface supporting the inner bottom surface of the visor from below and has a longitudinal surface confronting the inner side surface of the visor in parallel. The visor rotates with respect to the stay about a rotation axis which is perpendicular to the generally horizontal surface of the stay. The inner bottom surface of the visor and the inner side surface thereof form an opening angle which is more than a right angle (i.e. more than 90°) therebetween. The electric driving system comprises: a first stay side ring which is fixed to the stay about the rotation axis; a first visor side ring which is fixed to the visor about the rotation axis in which the first visor side ring is movable up and down, and in which the first visor side ring is above the first stay side ring; and a spring means for biasing the first visor side ring towards the first stay side ring at all times. Each of the first stay side ring and the first visor side ring has a first slidably contacting surface with the inclined surface, in which the first slidably contacting surface of the first stay side ring slidably contacts the first slidably contacting surface of the first visor side ring, and in which the inclined surface of the first slidably contacting surface of the first stay side ring and the inclined surface of the first slidably contacting surface of the first visor side ring ride on each other when the visor is rotated from the using position to the housing position.

According to the construction, when the visor rotates from the using position to the housing position, the inclined surface of the first visor side ring rides on the inclined surface of the first stay side ring. As a result, the first visor side ring is floated upwards together with the visor above the stay, which secures a gap between the stay and the first visor side ring as well as the visor. Therefore, the construction allows the visor to rotate without interference. Needless to say, the construction allows the gap to be securely formed between the inner bottom surface of the visor and the generally horizontal surface of the stay. Also, the construction has an advantage to secure the gap between the inner side surface of the visor and the longitudinal surface of the stay parallel therewith, because the inner side surface of the visor forms more than a 90 angle with respect to the inner bottom surface of the visor, and because the longitudinal surface of the stay, which is parallel with the inner side surface of the visor, also forms more than a 90 angle with respect to the inner bottom surface of the visor.

When the visor rotates reversely, namely, in a direction back from the housing position to the using position, the inclined surface of the first visor side ring slides down from the inclined surface of the first stay side ring. Depending upon a design of the lowermost ascending point of the visor, it is possible to make the gap approach zero as a limit. That is, the gap is almost zero; therefore, the problem of the generation of the air-striking sounds at the time of travelling of the automobile is solved.

According to the present invention, there is provided an improved type of electric driving mechanism of a door mirror assembly which further comprises a second visor side ring and a second stay side ring, which are added to the aforementioned construction. In the improved type thereof, the second visor side ring is integrally fixed to the first visor side ring with the second visor side ring being on a side opposite the first stay side ring; and a second stay side ring is movably mounted relative to the stay in the direction of up and down, movement in which the second stay side ring confronts the second visor side ring, and in which the second stay side ring is prevented from rotating relative to the stay. The spring means biases the second stay side ring, the second visor side ring, and the first visor side ring towards the first stay side ring. Each of the second stay side ring and the second visor side ring has a second slidably contacting surface with an inclined surface, in which the second slidably contacting surface of the second stay side ring slidably contacts the second slidably contacting surface of the second visor side ring, and in which the inclined surface of the second slidably contacting surface of the second stay side ring and the inclined surface of the second slidably contacting surface of the second visor side ring slide down from each other when the visor is rotated from the using position to the housing position.

According to the improved structure of the present invention, when the visor is rotated from the using position to the housing position, the inclined surface of the first slidably contacting surface of the first stay side ring and the inclined surface of the first slidably contacting surface of the first visor side ring, ride on each other; meanwhile, when the visor is rotated from the using position to the housing position, the inclined surface of the second slidably contacting surface of the second visor side ring and the inclined surface of the second slidably contacting surface of the second stay side ring slide down from each other. In other words, the inclined surface of the first slidably contacting surface of the first stay side ring and the inclined surface of the first slidably contacting surface of the first visor side ring, ride on each other against the biasing force of the spring means; consequently, a great torque is required. On the other hand, the inclined surface of the second slidably contacting surface of the second stay side ring and the inclined surface of the second slidably contacting surface of the second visor side ring, slide down from each other; consequently, the biasing force of the spring means is exerted upon the elements while sliding down from each other. That is, when the inclined surface of the second stay side ring slides down from the inclined surface of the second visor side ring, a component of the biasing force of the spring means gives the second visor side ring a rotational force in a direction towards the housing position. Hence, a part of the torque which is required for the inclined surface of the first visor side ring to ride on the inclined surface of the first stay side ring, is compensated with a rotational driving force being exerted when the inclined surface of the second stay side ring slides down from the inclined surface of the second visor side ring; and as a result, the torque is reduced by the rotational driving force. This means that the torque does not become so great even if the inclination angle, or slope angle, of each inclined surface thereof becomes great. With the slope angle thereof being great, the first and second visor side rings are, namely, the visor itself is, moved upwards rapidly when the visor is rotated from the using position to the housing position. That is, a sufficiently large gap between the visor and the stay is realized at an early stage of rotation of the visor from the using position to the housing position, and a smooth rotation of the visor is secured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8(A), 8(B) and 8(C), respectively, show a positional relationship between a visor and a stay of the door mirror assembly shown in FIGS. 6 and 7, and show a main part of the electric driving system thereof, in which FIG. 8(A) illustrates a using position of the visor; FIG. 8(B) illustrates a transition that the visor is rotated from the using position to a housing position; and FIG. 8(C) illustrates the housing position.

BEST MODE FOR CARRYING OUT THE INVENTION

Embodiments of the present invention will be described below in detail with reference to FIGS. 3 through 9. Firstly, a first embodiment thereof will be described with reference to FIGS. 3 through 5.

Figure 1:
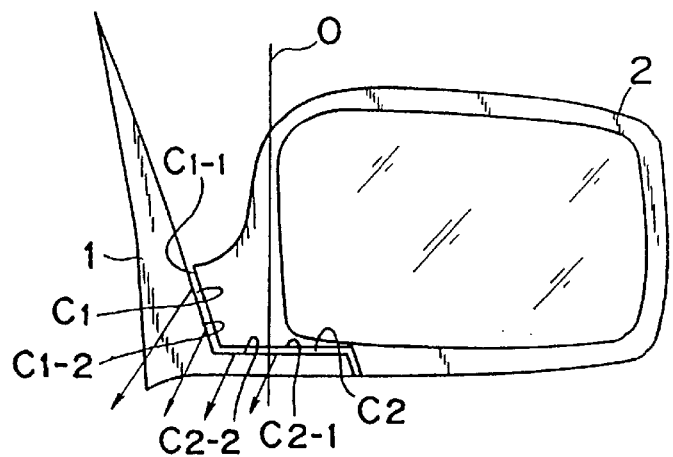
FIG. 1 is a front view showing a gap which is formed between a stay and a visor of a conventional door mirror assembly.
Figure 2:
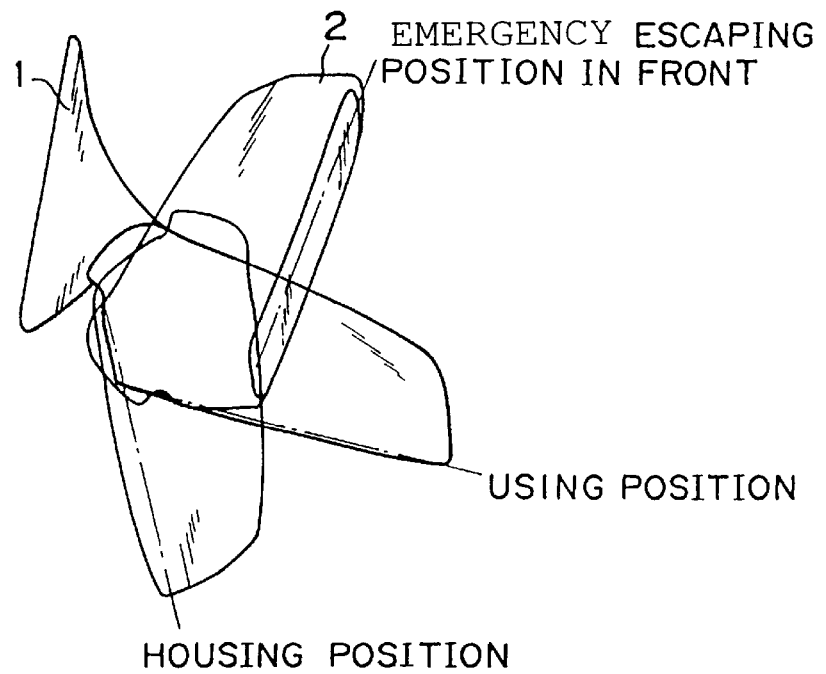
FIG. 2 is a plan view showing three positions taken by the visor shown in FIG. 1; namely, a housing position, a using position, and an emergency escaping position in front.
Figure 3:
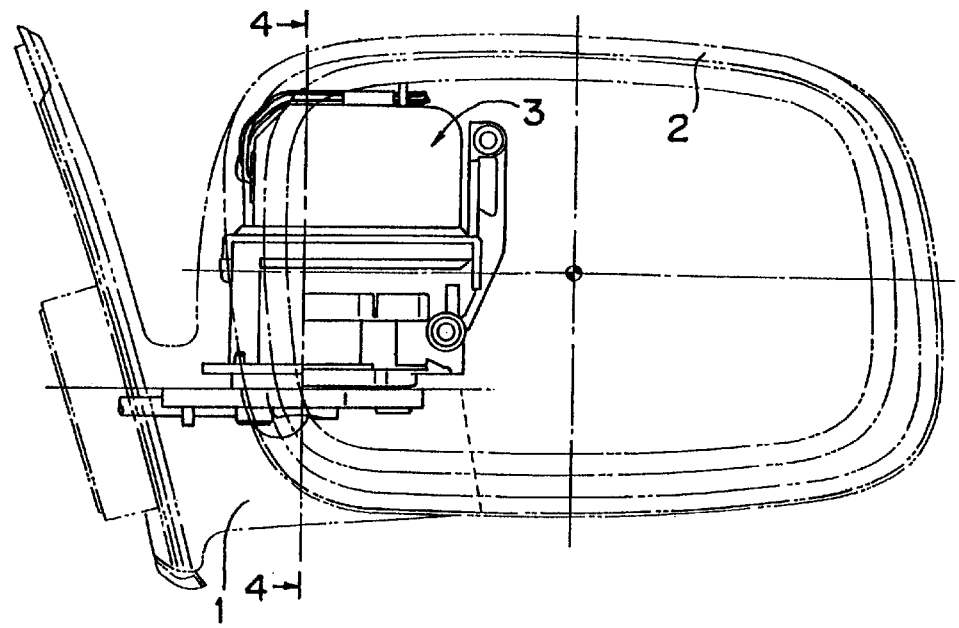
FIG. 3 is a front view showing a door mirror assembly, according to a first embodiment of the present invention, in which an electric driving system thereof is incorporated both in a visor and in a stay thereof.
Figure 4:
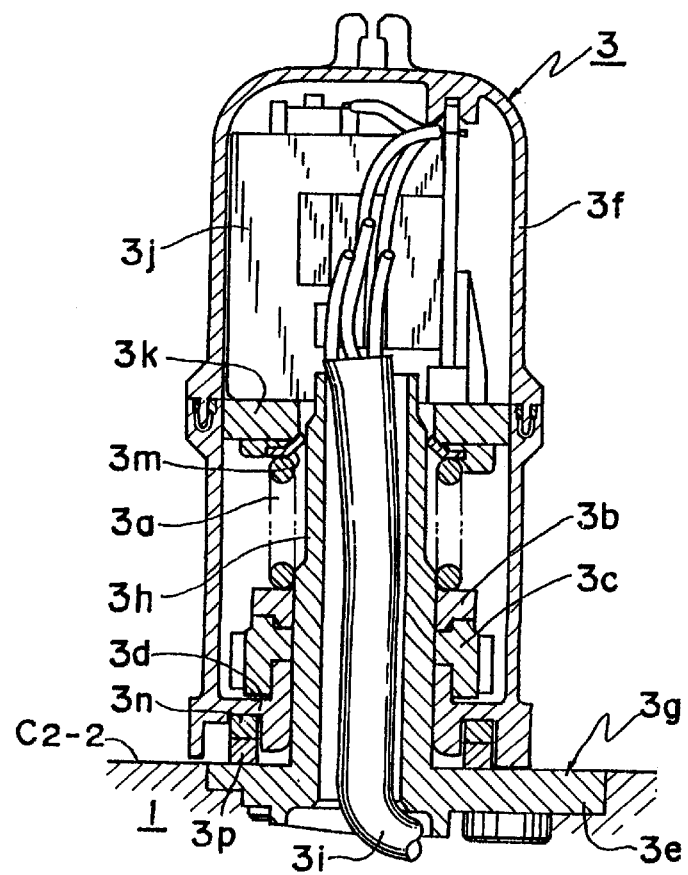
FIG. 4 is an enlarged sectional view taken along a line 4—4 of FIG. 3.

FIG. 3 shows a door mirror assembly which has a stay 1, a visor 2 and an electric driving system 3 for driving the visor 2 with respect to the stay 1. FIG. 4 is an enlarged sectional view taken along a line 4—4 of FIG. 3 and shows an inner structure of the electric driving system. The electric driving system has a general construction (except members 3d, 3n, and 3p) which are known, and a scheme thereof that will be described below.

A stand 3g is erected on a generally horizontal surface C2-2 of the stay 1. The stand 3g is constituted by a base 3e which is embedded in and fixed to the generally horizontal surface C2-2 of the stay 1, and is constituted by a hollow pole 3h which is erected vertically from the base 3e. A driving motor 3j, a motor base 3k, and other components, are positioned above the stand 3g. Around the periphery of the hollow pole 3h, there are arranged, from top to bottom, a spring seat 3m fixed to the hollow pole 3h, a coiled spring 3a, a clutch plate 3b, and a gear 3c. The clutch plate 3b and the gear 3c are movable relative to the pole 3h in an axial direction of the pole 3h; however, they cannot to rotate relative to the pole 3h. A wire harness 3i is provided inside the hollow pole 3h. The aforementioned driving elements are accommodated inside a housing 3f of the electric driving system 3 which is fixed to the visor 2.

A lower part of the housing 3f has a rotary disk 3d that is fitted around a periphery of the hollow pole 3h in which the rotary disk 3d is formed integrally with the lower part thereof. The rotary disk 3d is positioned below the gear 3c. Therefore, the coiled spring 3a continuously biases the clutch plate 3b, the gear 3c and the housing 3f downwards together.

A first visor side ring 3n is fixed to a lower surface of the rotary disk 3d. Meanwhile, a first stay side ring 3p is fixed to an upper surface of the base 3e of the stand 3g such that the first stay side ring 3p confronts the first visor side ring 3n. The first visor side ring 3n and the first stay side ring 3p are continuously pressed against each other by the spring force, or biasing force, of the coiled spring 3a.

The electric driving system has an unshown second gear which engages the gear 3c. The second gear is driven to rotate by the driving force of the driving motor 3j. Namely, when the second gear is driven to rotate by the driving force of the driving motor 3j, the second gear is rotated around the gear 3c together with the housing 3f and the visor 2, etc., because the gear 3c is prohibited from rotating. Therefore, the visor 2 rotates between the using position and the housing position.

Figure 5A:
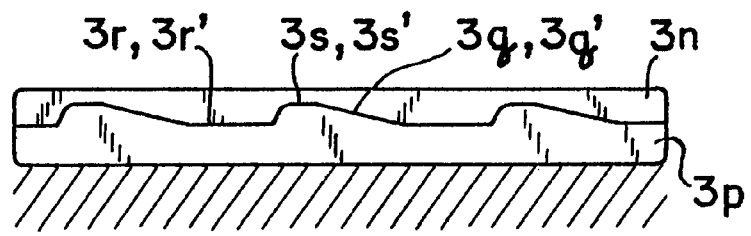
FIGS. 5(A), 5(B) and 5(C) are developed explanatory views showing a positional relation between a first visor side ring and a first stay side ring, shown in FIG. 4.
Figure 5B:
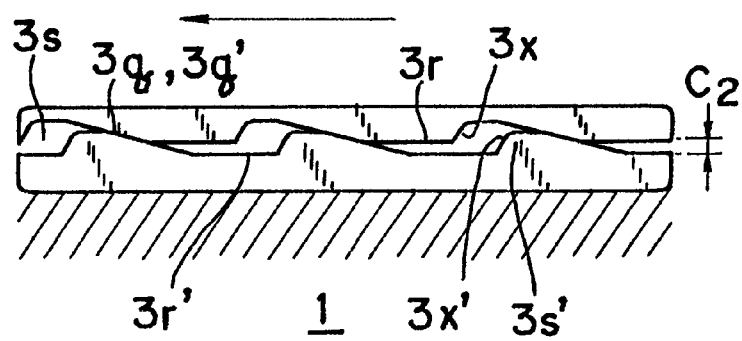
Figure 5C:
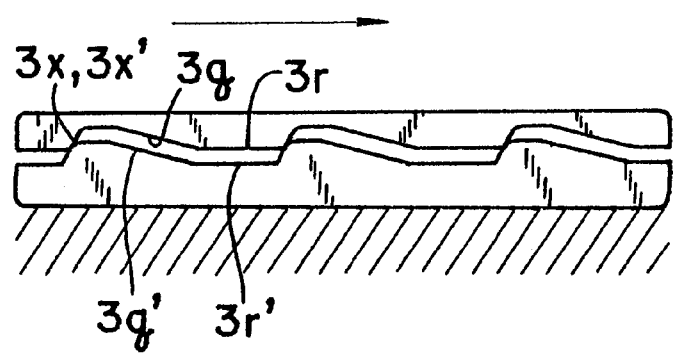

Each of the first visor side ring 3n and the first stay side ring 3p has a shape shown in FIGS. 5(A) through 5(C). The figures show the first visor side ring 3n and the first stay side ring 3p in a developed state: FIG. 5(A) shows a state thereof when the visor 2 is at the using position; FIG. 5(B) shows a state thereof when the visor 2 is moved from the using position to the housing position; and FIG. 5(C) shows a state thereof when the visor 2 is driven to move from the using position to the emergency escaping position in front by an external force.

Each of the first visor side ring 3n and the first stay side ring 3p has a sliding contact surface, or a slidabaly contacting surface, such that the sliding contact surfaces confront, or face, each other. Each of the sliding contact surfaces has a complementary shape to each other. That is, the stay side ring 3p has three ridge portions 3s' which project upwards at equal intervals therebetween from a plane 3r'; on the other hand, the visor side ring 3n has valley portions 3s each of which is formed concave upwards from a plane 3r. The ridge portions 3s' and the valley portions 3s engage each other at the using position shown in FIG. 5(A), under which condition there is little gap between the visor 2 and the stay 1 (refer to FIG. 8(A) showing a second embodiment).

Each ridge portion 3s' has slopes or inclined surfaces 3q' and 3x'; on the other hand, each valley portion 3s has slopes or inclined surfaces 3q and 3x. When the visor 2 is rotated from the using position to the housing position, the first visor side ring 3n rotating together with the visor 2 moves, or rotates, in a direction shown by an arrow in FIG. 5(B). As a result, the inclined surface 3q starts riding over the inclined surface 3q', so that there are formed gaps C1 and C2 between the visor 2 and the stay 1 (refer to FIG. 8(B)). That is, the gaps C1 and C2 are formed between the stay 1 and the visor 2, upon start of the rotation of the visor 2. Consequently, the construction allows the visor to rotate without interference. As the visor 2 is further rotated to come to the housing position, the inclined surface 3q is positioned completely on the inclined surface 3q'; as a result, the plane 3r of the first visor side ring 3n rides upon the ridge portion 3s' of the first stay side ring 3p (refer to FIG. 8 (C)). Meanwhile, when the visor 2 rotates in a direction from the housing position to the using position, a process opposite to the aforementioned one is taken. That is, the inclined surface 3q of the first visor side ring 3n gradually slides down the inclined surface 3q' of the first stay side ring 3p. As a result, the gaps C1 and C2 become gradually smaller, and the gaps almost become zero when the visor 2 comes to the using position shown in FIG. 5(A).

As described above, FIG. 5(C) shows it locating at the emergently escaping position in front. When the visor 2 is forcibly pressed forwards by an external force, the inclined surface 3x of the first visor side ring 3n rides over the inclined surface 3x' of the first stay side ring 3p. At this time, the visor 2 is also floated upwards from the stay 1, so that the gaps C1 and C2 are secured.

FIGS. 6 through 9 show the second embodiment. The second embodiment is related to an improvement thereof in which an instantaneous floating of the visor is realized as the visor is rotated, so as to secure a sufficiently large gap between the visor and the stay at an early stage of rotation of the visor.

Figure 6:
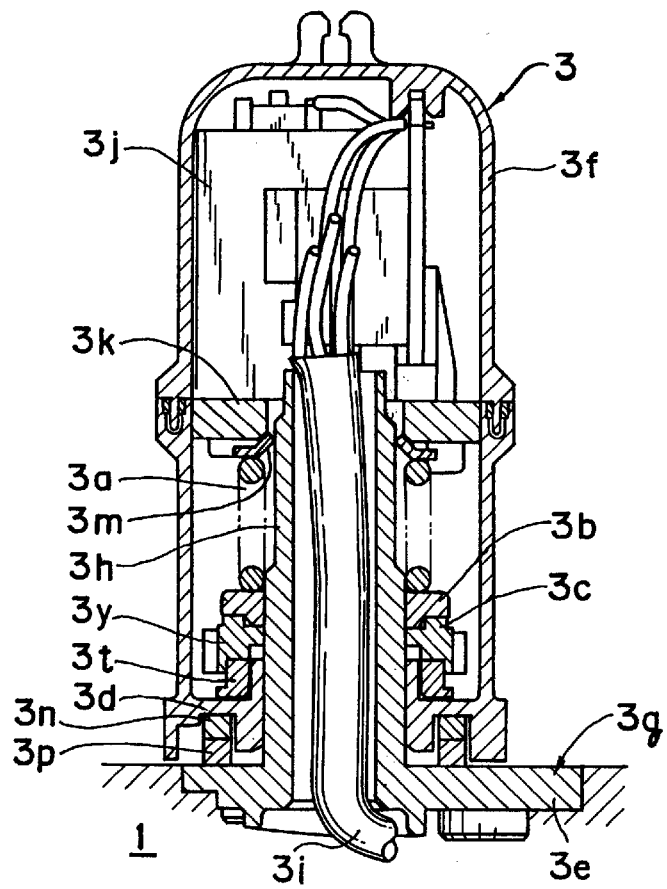
FIG. 6 is an enlarged sectional view, similar to FIG. 4, showing an electric driving system of the door mirror assembly according to a second embodiment of the present invention.

FIG. 6 is an enlarged sectional view similar to FIG. 4 showing the first embodiment. Because the fundamental construction of the electric driving system of this second embodiment is substantially similar to that of the first embodiment, a detailed description thereof is omitted herein. Thus, a construction of the second embodiment, different from that of the first embodiment, will be described below.

In the second embodiment, there are provided a second visor side ring 3t and a second stay side ring 3y in addition to the constituent elements, or components, employed in the first embodiment. That is, in the second embodiment, the second stay side ring 3y is integrally formed with an inner surface of a lower part of the gear 3c. Alternatively, it is also possible to form the second stay side ring 3y separately from the gear 3c. And, the second visor side ring 3t is interposed between the second stay side ring 3y and the rotary disk 3d, with the second visor side ring 3t being fixed to the rotary disk 3d.

Figure 7A:
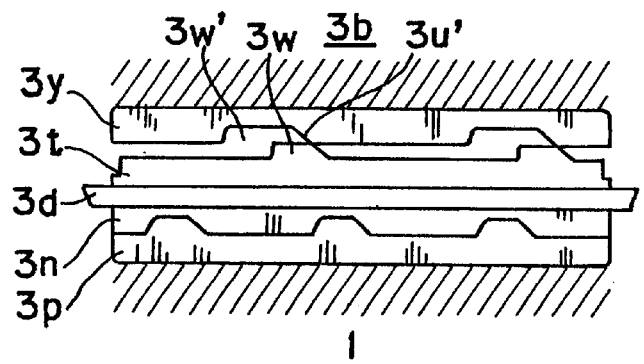
FIGS. 7(A), 7(B) and 7(C) are developed explanatory views showing a positional relationship between a first visor side ring and a first stay side ring, shown in FIG. 6.
Figure 7B:
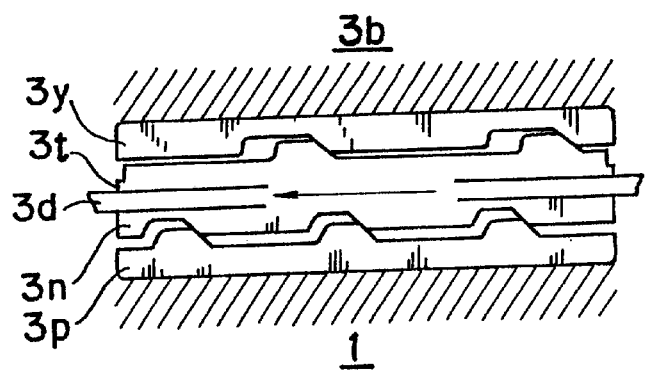
Figure 7C:
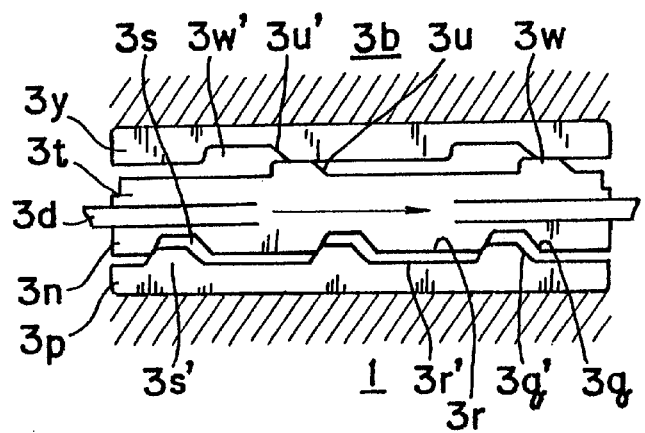

FIG. 7 is a developed view showing the first visor side ring 3n, the first stay side ring 3p, the second visor side ring 3t, and the second stay side ring 3y. The construction of the sliding contact surface of each of the first visor side ring 3n and the first stay side ring 3p of the second embodiment is identical to that of the sliding contact surface of each of those of the first embodiment. The second visor side ring 3t is substantially identical to the first stay side ring 3p; however, the former is different from the latter only in respect of the number of ridge portions and the phase thereof. Meanwhile, the second stay side ring 3y is substantially identical to the first visor side ring 3n; however, the former is different from the latter only in respect of the number of valley portions and the phase thereof. That is, the second visor side ring 3t has a pair of mountain portions 3w; on the other hand, the second stay side ring 3y has a pair of valley portions 3w'. Each of the mountain portions 3w and the valley portions 3w' has mutually ascending/descending slopes, or mutually ascending/descending inclined surfaces 3u and 3u', respectively.

Figure 9:
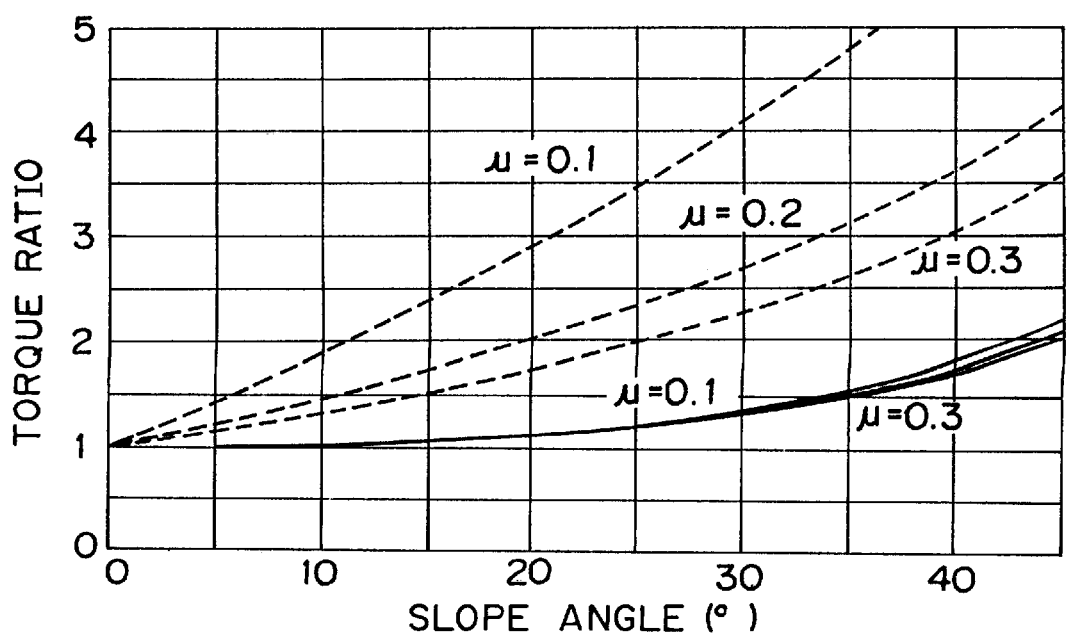
FIG. 9 is a graph showing a relation between a rotation torque ratio of the visor of each of the first and second embodiments and a slope angle of an inclined surface of the first stay/visor side ring.

As shown in FIGS. 7(A) and 8(A), at the using position of the visor 2, the engaging state in which the first visor side ring 3n and the first stay side ring 3p engage each other is exactly the same as that of the first embodiment. On the other hand, as shown in FIGS. 7(A) and 8(A), the mountain portion 3w of the second visor side ring 3t projects, or protrudes, towards the valley portion 3w' of the second stay side ring 3y. As shown in FIGS. 7(B) and 8(B), when the visor starts rotating from the using position to the housing position, the inclined surface 3q of the first visor side ring 3n start riding on the inclined surface 3q' of the first stay side ring 3p. At this time, the spring force of the coiled spring 3a tries to make the inclined surface 3u' of the second stay side ring 3y slides downwards over the inclined surface 3u of the second visor side ring 3t. As a result, a component in rotational direction of the spring biasing force which is exerted by the coiled spring 3a and which acts axially, tries to make the first visor side ring 3n, namely the visor itself, rotate in the direction of the housing position. Accordingly, when the visor 2 rotates from the using position to the housing position, the resistance that the inclined surface of the first visor side ring 3n receives is greatly reduced so that the visor 2 is easier to rotate. This situation is shown in FIG. 9. In FIG. 9, its ordinate indicates a torque ratio of rotation of the visor 2, and the abscissa indicates a slope angle, or an inclination angle, of the inclined surface 3q of the first visor side ring 3n as well as the inclined surface 3q' of the first stay side ring 3p. A reference symbol "$\mu$" therein designates a frictional coefficient of the inclined surface thereof; a broken line therein designates a case of the first embodiment, namely the case employing one set of rings; and a solid line therein designates a case of the second embodiment, namely the case employing two sets of rings. From this graph, it is found that the torque of rotation of the visor according to the second embodiment is much smaller than the torque of rotation thereof according to the first embodiment. Namely, such a great reduction in the torque of rotation of the visor means that it is possible to greatly, or sharply, increase the slope angle (i.e. inclination angle) of each of the inclined surfaces 3q and 3q' thereof, as apparent from a comparison between the slope angle thereof shown in FIG. 5 and the slope angle thereof shown in FIG. 7. In other words, this great or sharp increase of the slope angle thereof means that the gaps C1 and C2 between the stay 1 and the visor 2 becomes greater instantaneously at an early stage of rotation of the visor 2 from the using position to the housing position. With the arrangement, the possible friction exerting between the confronting surfaces of the visor and the stay can be minimized at time of rotation of the visor 2.

FIG. 8(C) shows a state in which the visor 2 has reached the housing position completely. At this time, the plane 3r rides, or is surmounted, on the ridge portion 3s' completely, and the mountain portion 3w is in engagement with the valley portion 3w'.

By the way, in case that the visor is rotated reversely from the housing position to the using position, the gap between the stay 1 and the visor 2 can be reduced as the visor 2 comes very close to the using position.

As shown in FIGS. 8(B) and 8(C), the inner side surface of the visor and the confronting (or facing) longitudinal surface of the stay incline with respect to the inner bottom surface of the visor and the generally horizontal surface of the stay 1, respectively. Therefore, when the visor 2 is floated upwards, the gap C1 is formed at the same time the gap C2 is formed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric driving mechanism of a door mirror assembly which comprises:

a stay which is mounted on an outer surface of a door;

a visor which is rotatably mounted on the stay between a using position and a housing position; and an electric driving system for rotating the visor with respect to the stay, wherein the visor has an inner bottom surface and an inner side surface, wherein the stay has a generally horizontal surface supporting the inner bottom surface of the visor from below and has a longitudinal surface confronting the inner side surface of the visor in parallel, wherein the visor rotates with respect to the stay about a rotation axis which is perpendicular to the generally horizontal surface of the stay, wherein the inner bottom surface of the visor and the inner side surface thereof form an opening angle which is more than a right angle therebetween, the electric driving system comprising:

a first stay side ring which is fixed to the stay about the rotation axis;

a first visor side ring which is fixed to the visor about the rotation axis, in which the first visor side ring is movable in up and down, directions and in which the first visor side ring is above the first stay side ring; and a spring means for biasing the first visor side ring against the first stay side ring at all times, and wherein each of the first stay side ring and the first visor side ring has a first slidably contacting surface with an inclined surface, in which the first slidably contacting surface of the first stay side ring slidably contacts the first slidably contacting surface of the first visor side ring, and in which the inclined surface of the first slidably contacting surface of the first stay side ring and the inclined surface of the first slidably contacting surface of the first visor side ring ride on each other when the visor is rotated from the using position to the housing position.

2. The electric driving mechanism of the door mirror assembly as claimed in claim 1, which further comprises:

a second visor side ring which is integrally fixed to the first visor side ring with the second visor side ring being on a side opposite the first stay side ring; and a second stay side ring which is movably mounted relative to the stay in up and down, directions in which the second stay side ring confronts the second visor side ring, and in which the second stay side ring is prevented from rotating relative to the stay, wherein the spring means biases the second stay side ring, the second visor side ring, and the first visor side ring towards the first stay side ring, and wherein each of the second stay side ring and the second visor side ring has a second slidably contacting surface with an inclined surface, in which the second slidably contacting surface of the second stay side ring slidably contacts the second slidably contacting surface of the second visor side ring, and in which the inclined surface of the second slidably contacting surface of the second stay side ring and the inclined surface of the second slidably contacting surface of the second visor side ring slide down each other when the visor is rotated from the using position to the housing position.

3. An electric driving mechanism of a door mirror assembly, comprising:

a visor;

a stay; and an electric driving system for rotating the visor relative to the stay, wherein the electric driving system comprises:

a visor side ring with an inclined surface; and a stay side ring with an inclined surface, wherein as the visor is rotated from a using position to a housing position, the inclined surface of the visor side ring and the inclined surface of the stay side ring ride on each other so that a gap is secured between the visor and the stay, and wherein the inclined surface of the visor side ring and the inclined surface of the stay side ring slide down each other when the visor is rotated from the housing position to the using position, so that the gap therebetween approaches to zero as the visor approaches to the using position.

* * * * *